(12) United States Patent
Li et al.

(10) Patent No.: US 10,897,694 B2
(45) Date of Patent: *Jan. 19, 2021

(54) PERSONAL AREA NETWORK COMMUNICATION FOR WEARABLE DEVICES

(71) Applicant: Apple Inc., Cupertino, CA (US)

(72) Inventors: Qian Li, Beaverton, OR (US); Geng Wu, Portland, OR (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/797,373

(22) Filed: Feb. 21, 2020

(65) Prior Publication Data

US 2020/0196123 A1 Jun. 18, 2020

Related U.S. Application Data

(63) Continuation of application No. 15/771,192, filed as application No. PCT/US2016/020096 on Feb. 29, 2016, now Pat. No. 10,582,360.

(Continued)

(51) Int. Cl.
*H04W 4/80* (2018.01)
*H04W 88/02* (2009.01)
(Continued)

(52) U.S. Cl.
CPC ............ *H04W 4/80* (2018.02); *H04W 8/005* (2013.01); *H04W 16/14* (2013.01); *H04W 48/16* (2013.01);
(Continued)

(58) Field of Classification Search
CPC ....... H04W 4/80; H04W 8/005; H04W 48/16; H04W 56/0025; H04W 74/002;
(Continued)

(56) References Cited

U.S. PATENT DOCUMENTS 9,510,289 B1* 11/2016 de Ruijter ......... H04W 52/0235
2006/0039450 A1* 2/2006 Fulton .................. H04B 1/7156
375/133

(Continued)

FOREIGN PATENT DOCUMENTS

CN 108029146 5/2018
TW 201715913 5/2017
(Continued)

OTHER PUBLICATIONS

"International Application Serial No. PCT/US2016/020096, International Search Report dated Jul. 26, 2016", 5 pgs.

(Continued)

*Primary Examiner* — Thanh C Le
(74) *Attorney, Agent, or Firm* — Kowert, Hood, Munyon, Rankin & Goetzel, P.C.

(57) ABSTRACT

Embodiments of a system and method for personal area network (PAN) communication for wearable devices in a wireless network are generally described herein. In some embodiments, a wearable user equipment (wUE) includes processing circuitry and transceiver circuitry. The processing circuitry is to: configure the wUE to enter into an active state; and configure the transceiver circuitry to: scan, in response to entering into the active state, for a Beacon signal from a network user equipment (nUE); upon failing to detect the Beacon signal, send a probe signal to the nUE; and upon detecting the Beacon signal or upon receiving a response to the probe signal, connect to a PAN associated with the nUE.

20 Claims, 8 Drawing Sheets

Related U.S. Application Data

(60) Provisional application No. 62/247,052, filed on Oct. 27, 2015.

(51) Int. Cl.

| | |
|---|---|
| *H04W 48/16* | (2009.01) |
| *H04W 56/00* | (2009.01) |
| *H04W 8/00* | (2009.01) |
| *H04W 16/14* | (2009.01) |
| *H04W 52/02* | (2009.01) |
| *H04W 68/00* | (2009.01) |
| *H04W 72/04* | (2009.01) |
| *H04W 72/12* | (2009.01) |
| *H04W 74/00* | (2009.01) |
| *H04W 74/08* | (2009.01) |
| *H04W 84/18* | (2009.01) |
| *H04W 92/18* | (2009.01) |

(52) U.S. Cl.
CPC ....... *H04W 52/0209* (2013.01); *H04W 56/00* (2013.01); *H04W 56/0025* (2013.01); *H04W 68/00* (2013.01); *H04W 72/0453* (2013.01); *H04W 72/1278* (2013.01); *H04W 74/002* (2013.01); *H04W 74/0816* (2013.01); *H04W 88/02* (2013.01); *H04W 84/18* (2013.01); *H04W 92/18* (2013.01)

(58) Field of Classification Search
CPC ......... H04W 72/1278; H04W 52/0209; H04W 72/0453; H04W 16/14; H04W 74/0816; H04W 68/00; H04W 84/18
See application file for complete search history.

(56) References Cited

U.S. PATENT DOCUMENTS

| | | |
|---|---|---|
| 2006/0199534 A1 | 9/2006 | Smith |
| 2009/0022139 A1 | 1/2009 | Lee et al. |
| 2010/0008273 A1 | 1/2010 | Stocks |
| 2010/0103918 A1 | 4/2010 | Song et al. |

FOREIGN PATENT DOCUMENTS

| | | |
|---|---|---|
| WO | 2015020484 | 2/2015 |
| WO | 2017074487 | 5/2017 |

OTHER PUBLICATIONS

"International Application Serial No. PCT/US2016/020096, Written Opinion dated Jul. 26, 2016", 10 pgs.

\* cited by examiner

PERSONAL AREA NETWORK COMMUNICATION FOR WEARABLE DEVICES

PRIORITY CLAIM

This application is a continuation of U.S. patent application Ser. No. 15/771,192, filed on Apr. 26, 2018, entitled "Personal Area Network Communication for Wearable Devices", which is a U.S. National Stage Filing under 35 U.S.C. 371 from International Application No. PCT/US2016/020096, filed Feb. 29, 2016, which claims the benefit of priority to U.S. Provisional Patent Application No. 62/247,052, filed Oct. 27, 2015, each of which is incorporated herein by reference in its entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to wireless communications. Some embodiments relate to personal area network communication for wearable devices.

BACKGROUND

Wearable devices, such as fitness trackers, smart watches, smart glasses, etc., are becoming more and more popular. Wearable devices are unique due to several features. In terms of hardware, wearable devices are generally small to fit conveniently on the user's body. Due to their small size, wearable devices typically have a low battery capacity and a low internal memory capacity. In terms of deployment, each person may carry multiple wearable devices, and may be located in a highly-dense populated scenario with other people carrying wearable devices. Furthermore, wearable devices have a wide range of use cases and traffics, ranging from a small sensor (e.g., heart rate sensor) to high-end multi-function wearables (e.g., smart watches or smart glasses). Traffic can range from small packet data to high-rate data streaming to ultra-low latency bursty data.

Thus, there are general needs for systems and methods for communication with wearable devices.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

As noted above, there are general needs for systems and methods for communication with wearable devices. Communication technologies for wearable devices may feature low power consumption, an ability to operate in a high-density scenario, support for ubiquitous connections with diverse traffic and applications, and an ability to communicate in licensed and unlicensed bands. Low power consumption is desirable due to the small battery size of some wearable devices. Ability to operate in a high-density scenario is desirable as a user may have several wearable devices and be surround (e.g., in a crowded subway train) by other users, each of whom has multiple wearable devices. Support for ubiquitous connections with diverse traffic and applications may be desirable to accommodate both simple wearable devices, such as calorie-burn monitors, and more complex wearable devices such as smart watches. Ability to communicate in licensed and unlicensed bands may be desirable to accommodate legacy devices and provide licensed bands upon the development of a licensed standard.

Figure 1:
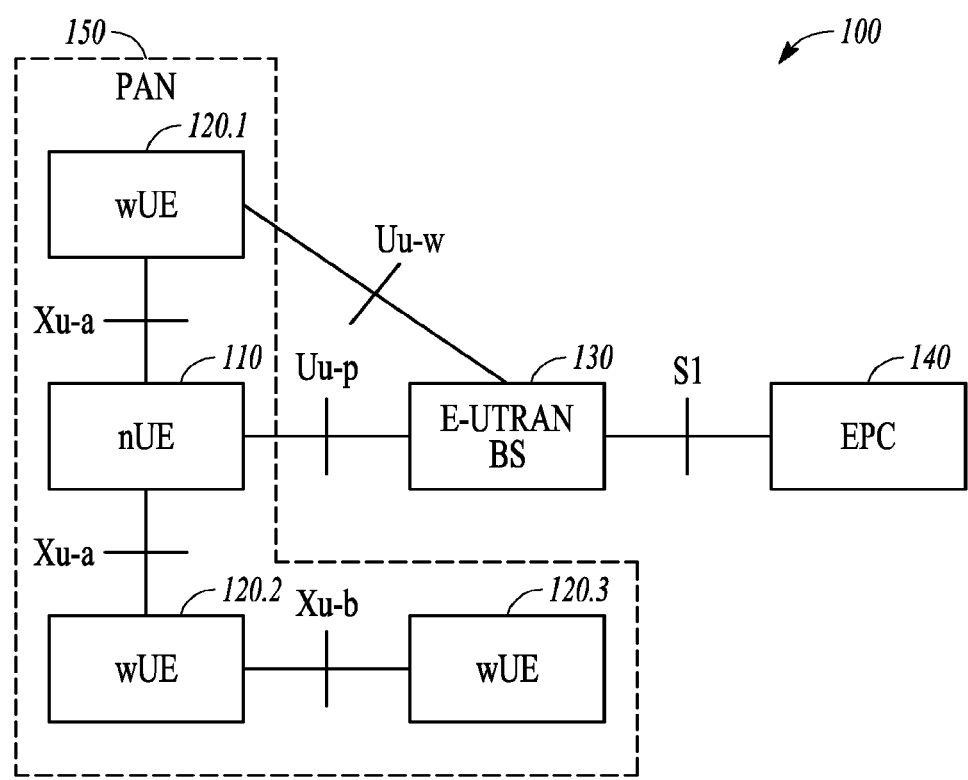
FIG. 1 is a block diagram of a system architecture for supporting wearable devices in accordance with some embodiments.

FIG. 1 is a block diagram of a system architecture 100 for supporting wearable devices. As shown, the system architecture 100 includes a network user equipment (nUE) 110, wearable user equipments (wUEs) 120.1-3, an evolved universal terrestrial radio access network (E-UTRAN) base station (BS) 130, and an evolved packet core (EPC) 140. The nUE 110 and the wUEs 120 together form a personal area network (PAN) 150.

The nUE 110 is any user equipment capable of communicating with the E-UTRAN base station 130 via an air interface. According to some examples, the nUE 110 is a mobile phone, a tablet computer, a smart watch, etc. According to some examples, the nUE may be a wUE that is capable of communicating with the E-UTRAN base station 130 and has sufficient battery life (e.g., greater than 30%, 50%, 75%, 90%, etc.). The nUE 110 has a full infrastructure network access protocol and full control and user plane (C/U-plane) functions. As shown, the nUE 110 communicates with the E-UTRAN base station 130 via a Uu-p air interface.

Each wUE 120.1-3 includes a wireless interface (Xu-a or Xu-b) for communicating within the PAN 150. The wUEs 120.1-3 include, in some cases, smart watches, smart glasses, smart headphones, fitness sensors, movement trackers, sleep sensors, etc. Some wUEs 120.1 and 120.2 communicate with the nUE 110 using Xu-a, an intra-PAN air interface between the nUE 110 and wUEs 120. Some wUEs 120.2 and 120.3 communicate with one another using Xu-b, an intra-PAN air interface among wUEs 120. Some wUEs 120.1 communicate directly with the E-UTRAN base station 130 via a Uu-w air interface.

The E-UTRAN base station 130 is, in some cases, a base station of a cellular network. According to some examples, the E-UTRAN base station 130 is an eNodeB (eNB) in a Long Term Evolution (LTE) cellular network. The E-UTRAN base station 130 communicates with the EPC 140 using a S1 interface. Some aspects of the subject technology are directed to defining the air interface between the E-UTRAN base station and the PAN of the nUE 110 and the wUEs 120 (Uu-p and Uu-w). Some aspects of the subject technology are directed to defining the intra-PAN air interface (Xu-a and Xu-b) for enabling low power wearable operation with diverse traffic and application requirements.

Some aspects of the subject technology may be implemented in conjunction with a LTE network, and, in some cases, leverages device-to-device (D2D) and machine-type communications (MTC) technology. However, for connectivity techniques, aspects of the subject technology address high-density scenarios. For LTE-D2D, some aspects of the subject technology enable PAN-specific identity, unicast in intra-PAN communication, uplink and downlink features, and operation in unlicensed bands. For LTE-MTC, some aspects of the subject technology provide support for diverse traffic, including high rate traffic and low latency traffic.

According to some examples, one or more of the wUEs 120 includes processing circuitry, transceiver circuitry, interface circuitry, and a memory. The processing circuitry configures the wUE 120 to enter into an active state. The processing circuitry configures the transceiver circuitry to scan, in response to entering into an active state, for a Beacon signal from the nUE 110. The processing circuitry configures the transceiver circuitry to, upon failing to detect the Beacon signal, send a probe signal to the nUE 110. The processing circuitry configures the transceiver circuitry to, upon detecting the Beacon signal or upon receiving a response to the probe signal, connect to the PAN 150. The processing circuitry configures the transceiver circuitry to, upon failing to receive a response to the probe signal for at least a threshold time period (e.g., 5 seconds, 10 seconds, etc.), connect directly with the E-UTRAN BS 130.

According to some examples, the nUEs 110 includes processing circuitry, transceiver circuitry, interface circuitry, and a memory. The processing circuitry configures the nUE 110 to enter into a PAN idle state. The processing circuitry configures the transceiver circuitry to listen, while in the PAN idle state, for a probe signal from the wUE 120. The processing circuitry configures the transceiver circuitry to, upon detecting the probe signal from the wUE 120, enter into a PAN awake state. The processing circuitry configures the transceiver circuitry to implement, upon entering into the PAN awake state, an access procedure for providing, to the wUE 120, access to the PAN 150 for communicating with the nUE 110.

As discussed in greater detail below, the Beacon signal includes a Sync preamble for synchronizing the nUE 110 and the wUE 120 in the PAN 150 according to a timing schedule. The probe signal includes the Sync preamble. Example data structures for the Beacon signal and the probe signal are provided in conjunction with FIG. 4 and FIG. 5.

Figure 2:
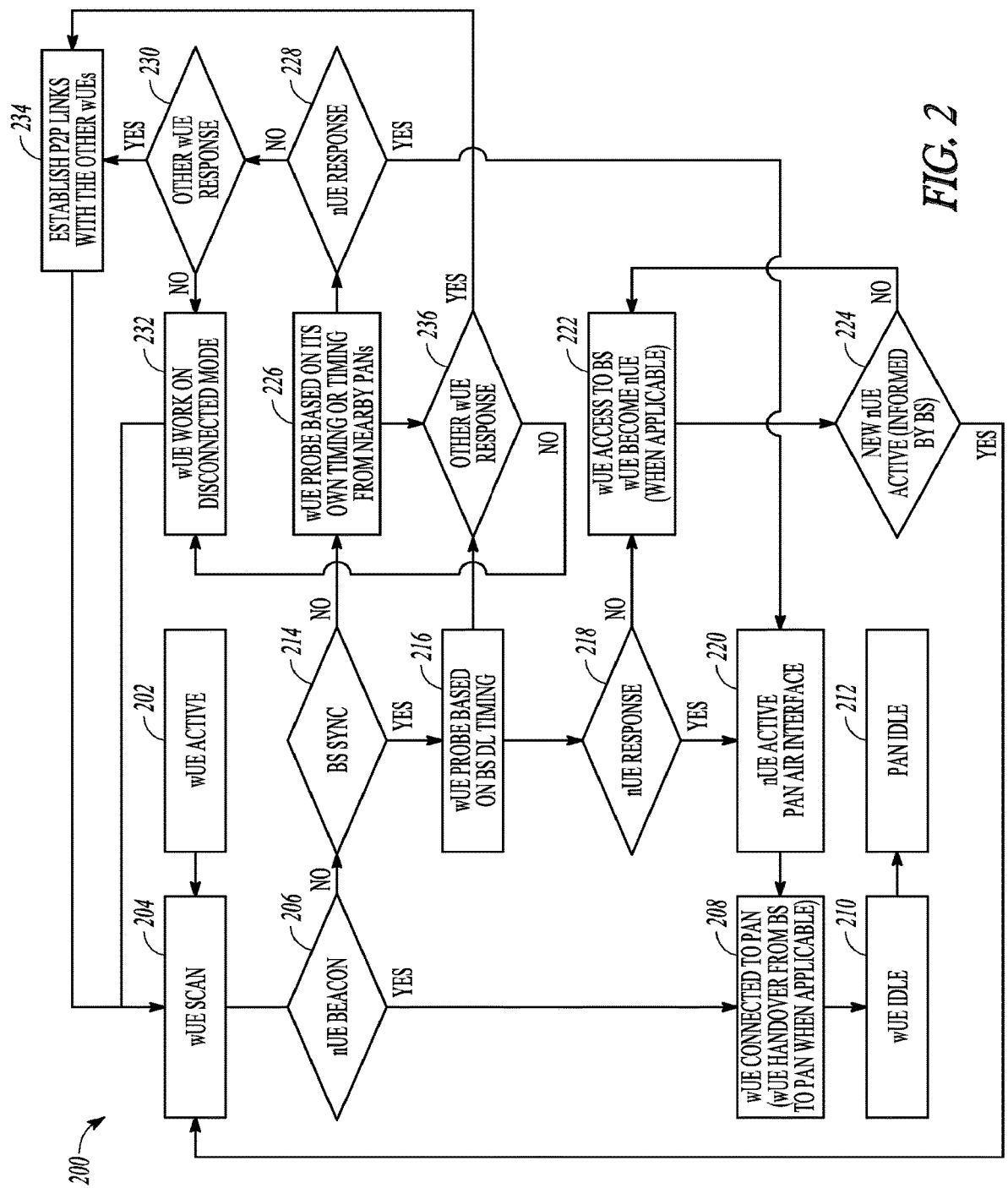
FIG. 2 is a state diagram for wearable radio access in accordance with some embodiments.

FIG. 2 is a state diagram of a method 200 for wearable radio access. The method 200 may be implemented at one of the wUEs 120 of FIG. 1.

The method 200 begins at operation 202, where a wUE 120 becomes active, for example, by being powered on or having its radio powered on. Upon becoming active, at operation 204, the wUE 120 runs a wUE scan for a nUE Beacon signal (e.g., from the nUE 110).

At operation 206, the wUE determines whether the nUE Beacon signal was detected in the wUE scan. If so, the method 200 continues to operation 208. If not, the method 200 continues to operation 214.

At operation 208, upon detecting the nUE Beacon signal, the wUE 120 connects to the PAN 150 of the nUE 110 from which it received the Beacon signal. If the control entity for the wUE 120 was previously the E-UTRAN base station 130, for example, if the wUE 120 was previously connected to the E-UTRAN base station 130, the control is handed over to the nUE 110 of the PAN 150. At operation 210, the wUE becomes idle. At operation 212, the PAN 150 becomes idle. The wUE or the PAN may be awakened upon receiving or transmitting a communication. After operation 212, the method 200 ends.

At operation 214, upon failing to detect the nUE Beacon signal, the wUE 120 attempts to sync with the E-UTRAN base station 130. If the wUE 120 is able to sync with the BS 130, the method 200 continues to operation 216. If the wUE 120 is unable to sync with the BS 130, the method 200 continues to operation 226.

At operation 216, upon syncing with the BS 130, the wUE 216 sends a wUE probe signal based on a downlink (DL) timing of the BS 130. After operation 216, the wUE 120 may receive a response to the wUE probe signal from the nUE 110 or another wUE. If the response is from the nUE 110, the method 200 continues to operation 218. If the response is not from the nUE 110 but is from another wUE, the method 200 continues to operation 236.

At operation 218, upon receiving the nUE response from the nUE 110, the wUE 120 determines whether the nUE remains awake and responsive to the wUE 120. If so, the method 200 continues to operation 220. If not, the method 200 continues to operation 222.

At operation 220, upon determining that the nUE 110 is responsive, the wUE 120 establishes communication with the nUE via an active PAN air interface (Xu-a of FIG. 1). After operation 220, the method 200 continues to operation 208.

At operation 222, upon determining the that the nUE 110 does not remain awake and responsive, the wUE 120 accesses the BS 130, which acts directly as the control entity for the wUE 120. If the wUE 120 has sufficient capabilities (e.g., battery life, cellular or WiFi network access, etc.) the wUE 120 may operate as a nUE. At operation 224, the wUE 120 determines whether the wUE 120 is informed by the BS 130 that it is activated as a new nUE. If so, the method 200 returns to operation 204. If not, the method 200 returns to operation 222.

At operation 226, upon determining (at operation 214) that the wUE 120 is unable to sync with the BS 130, the wUE 120 sends a wUE probe signal based on its own timing or timing from nearby PANs. If the wUE 120 receives a nUE response to the wUE probe signal, the method 200 continues to operation 228. If the wUE 120 receives a response from another wUE to the wUE probe signal, the method 200 continues to operation 236.

At operation 228, the wUE 120 determines whether the nUE 110 that responded to the wUE probe remains responsive. If so, the method 200 continues to operation 220, described above. If not, the method 200 continues to operation 230.

At operation 230 or operation 236, the wUE 120 determines whether the other wUE that responded to the probe signal remains responsive. If so, the method 200 continues to operation 234. If not, the method 200 continues to operation 232.

At operation 232, if the other wUE is not responsive, the wUE 120 works on disconnected mode. After operation 232, the method 200 returns to operation 204.

At operation 234, if the other wUE is responsive, the two wUEs establish a peer-to-peer (P2P) link with one another and communicate over the P2P link. After operation 234, the method 200 returns to operation 204.

In summary, as shown in the state diagram of FIG. 2, once a wUE 120 is turned into an active state, the wUE scans for a Beacon signal from the nUE 110. If the nUE Beacon signal is detected, an access procedure is implemented for the wUE 120 to connect to the PAN 150 of the nUE 110. If the nUE Beacon signal is not detected, the wUE sends out a probe signal. The timing for sending the probe signal may depend on the timing of the E-UTRAN BS 130 (if the wUE can connect to the E-UTRAN BS 130), depend on the timing of nearby PANs (detected, at the wUE 120, from the Sync preamble of the nearby PANs), or depend on the wUE's own timing.

The nUE 110 in PAN idle state periodically wakes up the PAN air interface to listen to the wUE probe (e.g., from the wUE 120). Upon detecting the wUE probe, the nUE 110 wakes up the PAN 150 in response to the wUE probe. Following that, the access procedure is implemented for the wUE 120 to connect to the PAN 150.

If the wUE 120 receives no response from the nUE 110, but detects a BS sync signal from the E-UTRAN BS 130, the wUE 120 accesses the infrastructure network directly via its connection to the E-UTRAN BS 130. The wUE 120 may become a nUE if the wUE is in a certain device category (e.g., a full service device, such as a smart watch or similar) an certain criteria (e.g., battery level) are met. If the wUE 120 receives no response from the nUE 110 and no response from the E-UTRAN BS 130, but receives a probe signal from other wUEs in the PAN 150, the two wUEs can establish a direct connection to one another.

Figure 3:
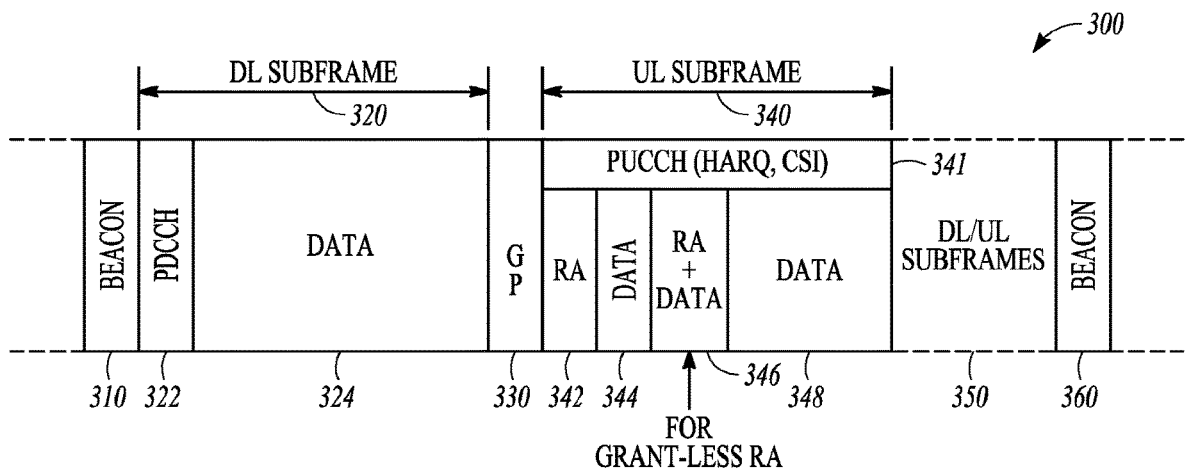
FIG. 3 is a block diagram of fields of an intra-personal area network frame structure in accordance with some embodiments.

FIG. 3 is a block diagram of fields of an intra-PAN frame structure 300. As shown, the frame structure 300 includes the Beacon signal 310, a downlink (DL) subframe 320, a guard period (GP) 330, an uplink (UL) subframe 340, and additional DL/UL subframes 350. A new frame begins at Beacon signal 360. The Beacon signals 310 and 360 include several fields, which are discussed in greater detail in conjunction with FIG. 4, below.

As shown, the DL subframe 320 includes a Physical Downlink Control Channel (PDCCH) field 322 and a data field 324. The PDCCH field 322 includes Downlink Control Information (DCI), Cell-specific Reference Signal (CRS), paging, and channel scheduling information for the DL subframe 320. The data field 324 includes the data to be transmitted within the DL subframe 320. Additional DL subframes, having a similar structure to the DL subframe 320, may be included within the DL/UL subframes 350.

The GP 330 provides a transition between the DL subframe 320 and the UL subframe 340. The GP 330 is used to ensure that distinct transmissions, such as the DL subframe 320 and the UL subframe 340, do not interfere with one another.

As shown, the UL subframe 340 includes a Physical Uplink Control Channel (PUCCH) field 341, a Random Access (RA) field 342, a data field 344, a combined grant-less RA and data field 346, and a data field 348. The PUCCH field 341 includes Hybrid Automatic Repeat Request (HARQ) and Channel State Information (CSI) and is used for uplink control. The combined grant-less RA and data field 346 may be useful for low latency transmissions. Additional UL subframes, having a similar structure to the UL subframe 340, may be included within the DL/UL subframes 350.

Intra-PAN communication using the frame structure 300 is synchronized and is based on dynamic Time-Division Duplex (TDD). The Beacon signal 310 is transmitted in each frame with a predefined timing. Following the Beacon signal 310, downlink and uplink subframes 320, 340, and 350 are transmitted. The Beacon signal 310 is used for frame synchronization, PAN system information, paging, and scheduling indication.

Figure 4:
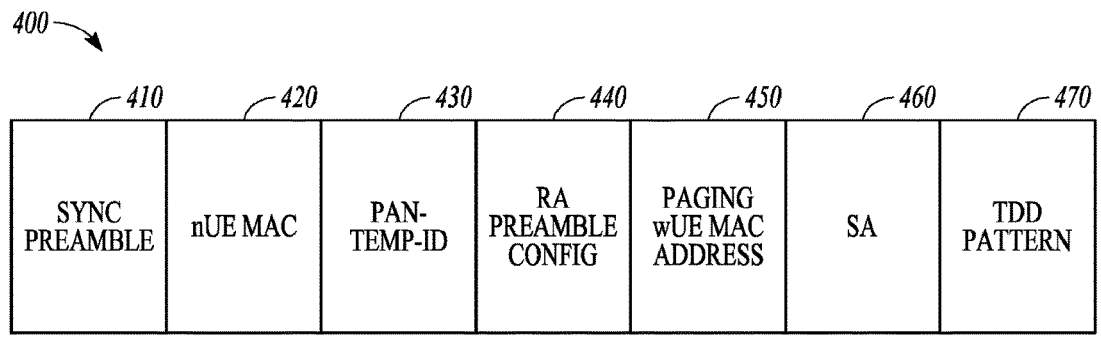
FIG. 4 is a block diagram of fields of a Beacon signal in accordance with some embodiments.

FIG. 4 is a block diagram of fields of a Beacon signal 400. The Beacon signal 400 may correspond to the Beacon signals 310 and 360 of FIG. 3. As shown, the Beacon signal 400 includes a Sync preamble 410, a nUE Media Access Control (MAC) address 420, a PAN-temp-ID 430, a RA preamble Config 440, a Paging wUE MAC address 450, a Scheduling Assignment (SA) 460, and a TDD pattern 470.

The Sync preamble 410 is common for PANs within a cell. The Sync preamble 410 is used for syncing the nUE 110 and the wUEs 120 together. The nUE MAC address 420 is known to wUEs 120 in the PAN 150. The nUE MAC address is used for PAN identification and association. The PAN-temp-ID 430 is used for scrambling control and data channels, which helps in achieving PAN-specific detection and interference randomization among PANs. The PAN-temp-ID 430 is used in data transmission to identify the data as being associated with the host nUE 110 of the PAN 150. The PAN-temp-ID 430 is periodically reselected to reduce collision probability.

The RA preamble Config 440 is used to configure the RA preambles for wUEs 120 in the PAN 150. The RA preamble Config 440 allows the wUEs 120 to transmit RA information. The Paging wUE MAC address 450 is used to page the idle wUEs 120 in the PAN 150. The Paging wUE MAC address 450 is used to inform the idle wUEs 120 to wake up when necessary. The SA 460 is for indicating the resource scheduling assignment to be used for the intra-PAN communication. The SA 460 indicates in which part of the spectrum the frame is to be transmitted. The TDD pattern 470 indicates the dynamic TDD pattern in the frame.

In the DL subframe 320 of FIG. 3, control and data channels are multiplexing in the time or frequency domain. FIG. 3 illustrates one approach for control and data multiplexing. Other multiplexing approaches may also be used in conjunction with some aspects of the subject technology. Similarly, in the UL subframe 340, any multiplexing approach, not necessarily the one illustrated in FIG. 3, may be used in conjunction with the subject technology. For the random access channel, in addition to the contention-based and schedule-based random access approaches, grant-less random access is also used for small packets or low latency traffic. Grant-less random access may use random access preamble and data.

Figure 5:
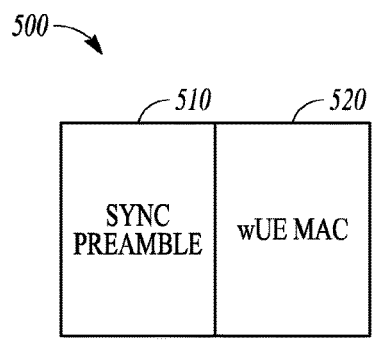
FIG. 5 is a block diagram of fields of a probe signal in accordance with some embodiments.

FIG. 5 is a block diagram of fields of a probe signal 500. The probe signal 500 is sent from the wUE 120, as discussed, for example, in conjunction with FIG. 2. As shown, the probe signal 500 includes a Sync preamble 510 and a wUE MAC address 520. The Sync preamble 510 is a common signal used by the devices (the nUE 110 and wUEs 120) in the PAN 150 for synchronization. The wUE MAC address 520 is used for peer identification, to identify the corresponding wUE 120 as belonging to a PAN 150 associated with the nUE 110.

Intra-PAN communication can include licensed band communication and unlicensed band communication. When operating in licensed band, the intra-PAN communication takes the resources allocated for D2D communication or the resources allocated by the E-UTRAN BS 130 for intra-PAN communication. Like in D2D communication, the E-UTRAN BS 130 indicates a pool of resources for intra-PAN communication. Each of the PANs connected with the E-UTRAN BS 130 selects (e.g., randomly) one portion of the resources from the resource pool. In a high density scenario, the E-UTRAN BS 130 helps schedule resource allocation among the PANs. According to one approach, the E-UTRAN BS 130 fully controls the resource allocation among the PANs. According to another approach, the E-UTRAN BS 130 groups the PANs based on their geographic locations and interference conditions, and assigns different resource pools to different groups.

Figure 6:
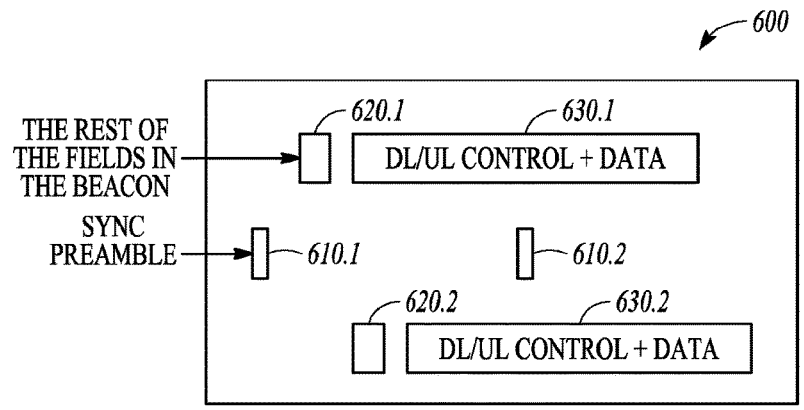
FIG. 6 illustrates a mapping of the personal area network frame structure to physical resources in accordance with some embodiments.

FIG. 6 illustrates a mapping of the personal area network frame structure 600 to physical resources. As shown, the PAN frame is time aligned with the cellular system frame. In FIG. 6, the Sync preambles 610.1-2 correspond to the Sync preamble 410 of the Beacon signal 400 of FIG. 4. The remaining fields 620.1-2 correspond to the other fields 420, 430, 440, 450, 460, and 470 of the Beacon signal 400. The DL/UL Control and Data fields 630.1-2 correspond to the DL and UL subframes 320, 340, and 350 of FIG. 3. As shown in FIG. 6, the Sync preamble 610.1-2 resides in the middle of the spectrum. The remaining fields 620.1-2 of the Beacon signal 400 and the DL/UL Control and Data 630.1-2 reside in the upper and lower portions of the spectrum.

When operating in the unlicensed band, the PANs need to co-exist with other legacy systems operating in the same band. In some examples, carrier sensing or listen before talk algorithms are implemented to avoid collision. Once a common resource pool is reserved by the PANs, each PAN may select resources for its own operation. For example, the resource mapping of FIG. 6 may be used. Coordination at the E-UTRAN BS 130 may be implemented to group PANs in resource acquisition and resource selection.

Figure 7:
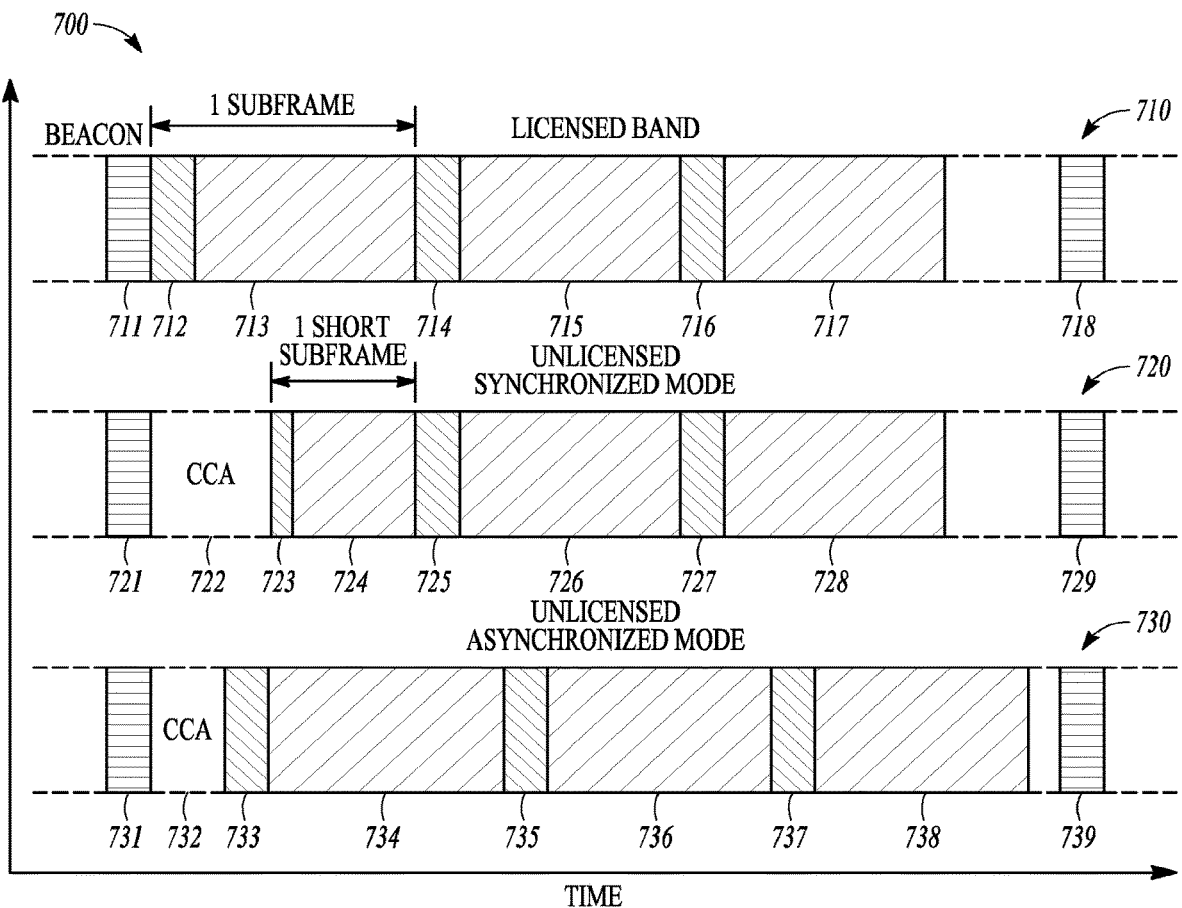
FIG. 7 illustrates personal area network frame timing in accordance with some embodiments.

FIG. 7 illustrates personal area network frame timing 700 in accordance with some embodiments. As illustrated in FIG. 7, when operating in unlicensed band, clear channel assessment (CCA) is performed for co-existence with other technologies operating in the unlicensed band. Short subframe is used to enable frame alignment in the synchronization operation. Time is shown on the horizontal axis (x-axis) of FIG. 7.

FIG. 7 is discussed below in conjunction with downlink subframes having PDCCH. However, in some cases, one or more of the downlink subframes may be replaced with an uplink subframe having a PUCCH in place of the PDCCH.

Timing 710 is for a licensed band frame. First, the Beacon signal 711 (e.g., corresponding to Beacon signal 310) is sent. Following the Beacon signal, a subframe including PDCCH 712 (e.g., corresponding to PDCCH 322) and data 713 (e.g., corresponding to data 324) is sent. Additional subframes follow, for example, the subframe of PDCCH 714 and data 715, and the subfame of PDCCH 716 and data 717. Finally, another Beacon signal 718 is send to indicate the beginning of a new frame.

Timing 720 is for an unlicensed band in synchronized mode. First, a Beacon signal 721 is sent, followed by a CCA block 722. Following the CCA, a short subframe including PDCCH 723 and data 724 is sent. A regular subframe including PDCCH 725 and data 726 follows. Another regular subframe including PDCCH 727 and data 728 follows. Finally, another Beacon signal 729 is sent to indicate the beginning of a new frame.

Timing 730 is for an unlicensed band in asynchronized mode. First, a Beacon signal 731 is sent, followed by a CCA block 732. A regular subframe including PDCCH 733 and data 734 follows. Additional regular subframes, for example, the subframe of PDCCH 735 and data 736, and the subframe of PDCCH 737 and data 738 follow. Finally, another Beacon signal 739 is sent to indicate the beginning of a new frame.

Figure 8:
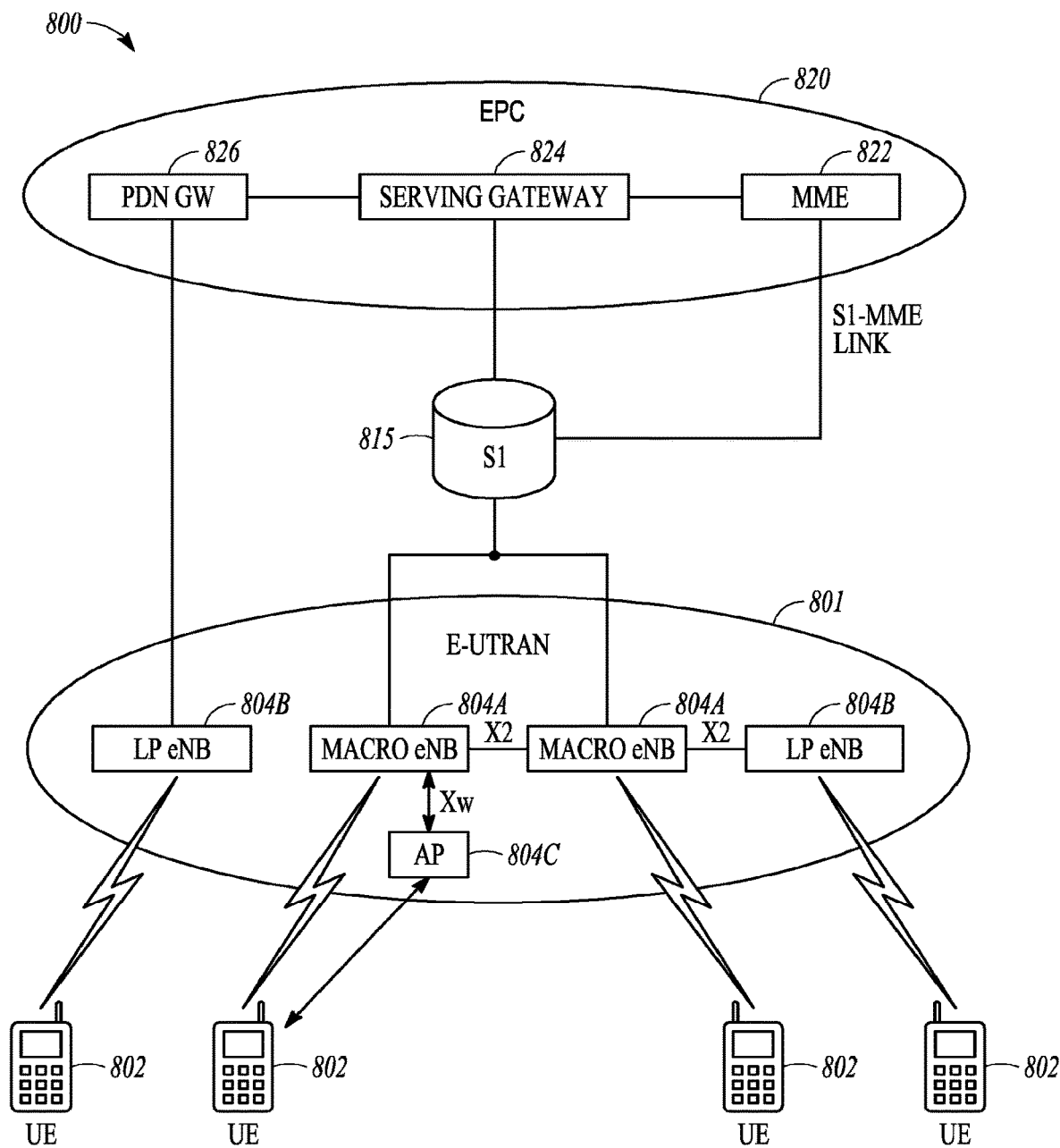
FIG. 8 is a functional diagram of a wireless network in accordance with some embodiments.

FIG. 8 shows an example of a portion of an end-to-end network architecture of a Long Term Evolution (LTE) network with various components of the network in accordance with some embodiments. As used herein, an LTE network refers to both LTE and LTE Advanced (LTE-A) networks as well as other versions of LTE networks to be developed. The network 800 may comprise a radio access network (RAN) (e.g., as depicted, the E-UTRAN or evolved universal terrestrial radio access network) 801 and core network 820 (e.g., shown as an evolved packet core (EPC)) coupled together through an S1 interface 815. For convenience and brevity, only a portion of the core network 820, as well as the RAN 801, is shown in the example.

The core network 820 may include a mobility management entity (MME) 822, serving gateway (serving GW) 824, and packet data network gateway (PDN GW) 826. The RAN 801 may include evolved node Bs (eNBs) 804 (which may operate as base stations) for communicating with user equipment (UE) 802. The eNBs 804 may include macro eNBs 804*a* and low power (LP) eNBs 804*b*. The UEs 802 may correspond to the nUE 110 or the wUE 120 of FIG. 1. The eNBs 804 may correspond to the E-UTRAN BS 130 of FIG. 1. The core network 820 may correspond to the EPC 140 of FIG. 1.

The MME 822 may be similar in function to the control plane of legacy Serving GPRS Support Nodes (SGSN). The MME 822 may manage mobility aspects in access such as gateway selection and tracking area list management. The serving GW 824 may terminate the interface toward the RAN 801, and route data packets between the RAN 801 and the core network 820. In addition, the serving GW 824 may be a local mobility anchor point for inter-eNB handovers and also may provide an anchor for inter-3GPP mobility. Other responsibilities may include lawful intercept, charging, and some policy enforcement. The serving GW 824 and the MME 822 may be implemented in one physical node or separate physical nodes.

The PDN GW 826 may terminate a SGi interface toward the packet data network (PDN). The PDN GW 826 may route data packets between the EPC 820 and the external PDN, and may perform policy enforcement and charging data collection. The PDN GW 826 may also provide an anchor point for mobility devices with non-LTE access. The external PDN can be any kind of IP network, as well as an IP Multimedia Subsystem (IMS) domain. The PDN GW 826 and the serving GW 824 may be implemented in a single physical node or separate physical nodes.

The eNBs 804 (macro and micro) may terminate the air interface protocol and may be the first point of contact for a UE 802. In some embodiments, an eNB 804 may fulfill various logical functions for the RAN 801 including, but not limited to, RNC (radio network controller functions) such as radio bearer management, uplink and downlink dynamic radio resource management and data packet scheduling, and mobility management. In accordance with embodiments, UEs 802 may be configured to communicate orthogonal frequency division multiplexed (OFDM) communication signals with an eNB 804 over a multicarrier communication channel in accordance with an OFDMA communication technique. The OFDM signals may comprise a plurality of orthogonal subcarriers.

The S1 interface 815 may be the interface that separates the RAN 801 and the EPC 820. It may be split into two parts: the S1-U, which may carry traffic data between the eNBs 804 and the serving GW 824, and the S1-MME, which may be a signaling interface between the eNBs 804 and the MME 822. The X2 interface may be the interface between eNBs 804. The X2 interface may comprise two parts, the X2-C and X2-U. The X2-C may be the control plane interface between the eNBs 804, while the X2-U may be the user plane interface between the eNBs 804.

With cellular networks, LP cells 804b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 804b might be a femtocell eNB since it is coupled through the PDN GW 826. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 804a via an X2 interface. Picocell eNBs or other LP eNBs LP eNB 804b may incorporate some or all functionality of a macro eNB LP eNB 804a. In some cases, this may be referred to as an access point base station or enterprise femtocell.

In some embodiments, the UE 802 may communicate with an access point (AP) 804c. The AP 804c may use only the unlicensed spectrum (e.g., WiFi bands) to communicate with the UE 802. The AP 804c may communicate with the macro eNB 804A (or LP eNB 804B) through an Xw interface. In some embodiments, the AP 804c may communicate with the UE 802 independent of communication between the UE 802 and the macro eNB 804A. In other embodiments, the AP 804c may be controlled by the macro eNB 804A and use LWA, as described in more detail below.

Communication over an LTE network may be split up into 10 ms frames, each of which may contain ten 1 ms subframes. Each subframe of the frame, in turn, may contain two slots of 0.5 ms. Each subframe may be used for uplink (UL) communications from the UE to the eNB or downlink (DL) communications from the eNB to the UE. In one embodiment, the eNB may allocate a greater number of DL communications than UL communications in a particular frame. The eNB may schedule transmissions over a variety of frequency bands ($f_1$ and $f_2$). The allocation of resources in subframes used in one frequency band and may differ from those in another frequency band. Each slot of the subframe may contain 6-7 OFDM symbols, depending on the system used. In one embodiment, the subframe may contain 12 subcarriers. A downlink resource grid may be used for downlink transmissions from an eNB to a UE, while an uplink resource grid may be used for uplink transmissions from a UE to an eNB or from a UE to another UE. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A resource block may be 180 kHz wide in frequency and 1 slot long in time. In frequency, resource blocks may be either 12×15 kHz subcarriers or 24×7.5 kHz subcarriers wide. For most channels and signals, 12 subcarriers may be used per resource block, dependent on the system bandwidth. In Frequency Division Duplexed (FDD) mode, both the uplink and downlink frames may be 10 ms and frequency (full-duplex) or time (half-duplex) separated. In Time Division Duplexed (TDD), the uplink and downlink subframes may be transmitted on the same frequency and are multiplexed in the time domain. The duration of the resource grid 400 in the time domain corresponds to one subframe or two resource blocks. Each resource grid may comprise 12 (subcarriers)*14 (symbols) =168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the FFT period signal is received and digitized, the receiver may ignore the signal in the CP.

There may be several different physical downlink channels that are conveyed using such resource blocks, including the physical downlink control channel (PDCCH) and the physical downlink shared channel (PDSCH). Each subframe may be partitioned into the PDCCH and the PDSCH. The PDCCH may normally occupy the first two symbols of each subframe and carries, among other things, information about the transport format and resource allocations related to the PDSCH channel, as well as H-ARQ information related to the uplink shared channel. The PDSCH may carry user data and higher layer signaling to a UE and occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the PDCCH used for (assigned to) the UE. The PDCCH may contain downlink control information (DCI) in one of a number of formats that indicate to the UE how to find and decode data, transmitted on PDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the PDSCH is intended. Use of the UE-specific RNTI may limit decoding of the DCI format (and hence the corresponding PDSCH) to only the intended UE.

Figure 9:
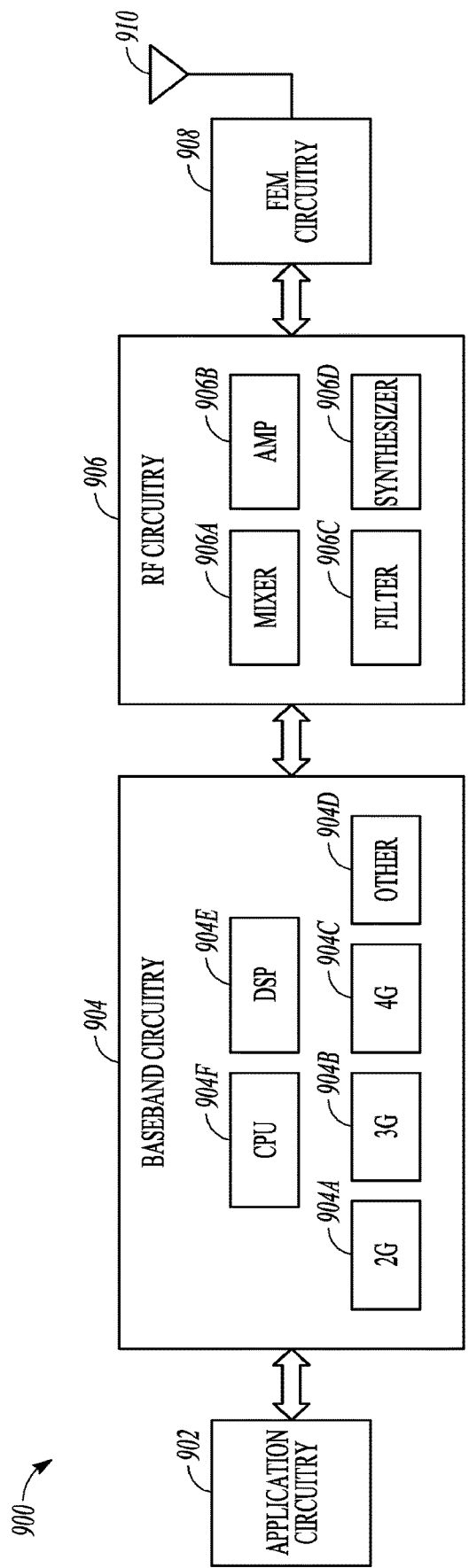
FIG. 9 illustrates components of a communication device in accordance with some embodiments.

Embodiments described herein may be implemented into a system using any suitably configured hardware and/or software. FIG. 9 illustrates components of a UE in accordance with some embodiments. At least some of the components shown may be used in an eNB or MME, for example, such as the UE 802 or eNB 804 shown in FIG. 8 or the nUE 110, wUE 120 or E-UTRAN BS 130 of FIG. 1. The UE 900 and other components may be configured to use the synchronization signals as described herein. The UE 900 may be one of the UEs 902 shown in FIG. 1 and may be a stationary, non-mobile device or may be a mobile device. In some embodiments, the UE 900 may include application circuitry 902, baseband circuitry 904, Radio Frequency (RF) circuitry 906, front-end module (FEM) circuitry 908 and one or more antennas 910, coupled together at least as shown. At least some of the baseband circuitry 904, RF circuitry 906, and FEM circuitry 908 may form a transceiver. In some embodiments, other network elements, such as the eNB may contain some or all of the components shown in FIG. 9. Other of the network elements, such as the MIME, may contain an interface, such as the S1 interface, to communicate with the eNB over a wired connection regarding the UE.

The application or processing circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 904 may include circuitry such as, but not limited to, one or more single-core or multi-core processors. The baseband circuitry 904 may include one or more baseband processors and/or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) may handle various radio control functions that enable communication with one or more radio networks via the RF circuitry 906. The radio control functions may include, but are not limited to, signal modulation/demodulation, encoding/decoding, radio frequency shifting, etc. In some embodiments, modulation/demodulation circuitry of the baseband circuitry 904 may include FFT, precoding, and/or constellation mapping/demapping functionality. In some embodiments, encoding/decoding circuitry of the baseband circuitry 904 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 may be configured to run elements of the protocol stack for signaling of the PHY, MAC, RLC, PDCP and/or RRC layers. In some embodiments, the baseband circuitry may include one or more audio digital signal processor(s) (DSP) 904f. The audio DSP(s) 904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the RF circuitry 906 may include a receive signal path and a transmit signal path. The receive signal path of the RF circuitry 906 may include mixer circuitry 906a, amplifier circuitry 906b and filter circuitry 906c. The transmit signal path of the RF circuitry 906 may include filter circuitry 906c and mixer circuitry 906a. RF circuitry 906 may also include synthesizer circuitry 906d for synthesizing a frequency for use by the mixer circuitry 906a of the receive signal path and the transmit signal path. In some embodiments, the mixer circuitry 906a of the receive signal path may be configured to down-convert RF signals received from the FEM circuitry 908 based on the synthesized frequency provided by synthesizer circuitry 906d. The amplifier circuitry 906b may be configured to amplify the down-converted signals and the filter circuitry 906c may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906a of the receive signal path may comprise passive mixers, although the scope of the embodiments is not limited in this respect.

In some embodiments, the mixer circuitry 906a of the transmit signal path may be configured to up-convert input baseband signals based on the synthesized frequency provided by the synthesizer circuitry 906d to generate RF output signals for the FEM circuitry 908. The baseband signals may be provided by the baseband circuitry 904 and may be filtered by filter circuitry 906c. The filter circuitry 906c may include a low-pass filter (LPF), although the scope of the embodiments is not limited in this respect.

In some embodiments, the mixer circuitry 906a of the receive signal path and the mixer circuitry 906a of the transmit signal path may include two or more mixers and may be arranged for quadrature downconversion and/or upconversion respectively. In some embodiments, the mixer circuitry 906a of the receive signal path and the mixer circuitry 906a of the transmit signal path may include two or more mixers and may be arranged for image rejection (e.g., Hartley image rejection). In some embodiments, the mixer circuitry 906a of the receive signal path and the mixer circuitry 906a may be arranged for direct downconversion and/or direct upconversion, respectively. In some embodiments, the mixer circuitry 906a of the receive signal path and the mixer circuitry 906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906d may be a fractional-N synthesizer or a fractional N/N+1 synthesizer, although the scope of the embodiments is not limited in this respect as other types of frequency synthesizers may be suitable. For example, synthesizer circuitry 906d may be a delta-sigma synthesizer, a frequency multiplier, or a synthesizer comprising a phase-locked loop with a frequency divider.

The synthesizer circuitry 906d may be configured to synthesize an output frequency for use by the mixer circuitry 906a of the RF circuitry 906 based on a frequency input and a divider control input. In some embodiments, the synthesizer circuitry 906d may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906d of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (Co). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910.

In some embodiments, the FEM circuitry 908 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910.

In some embodiments, the UE 900 may include additional elements such as, for example, memory/storage, display, camera, sensor, and/or input/output (I/O) interface as described in more detail below. In some embodiments, the UE 900 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 900 may include one or more user interfaces designed to enable user interaction with the system and/or peripheral component interfaces designed to enable peripheral component interaction with the system. For example, the UE 900 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 910 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 910 may be effectively separated to take advantage of spatial diversity and the different channel characteristics that may result.

Although the UE 900 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 10:
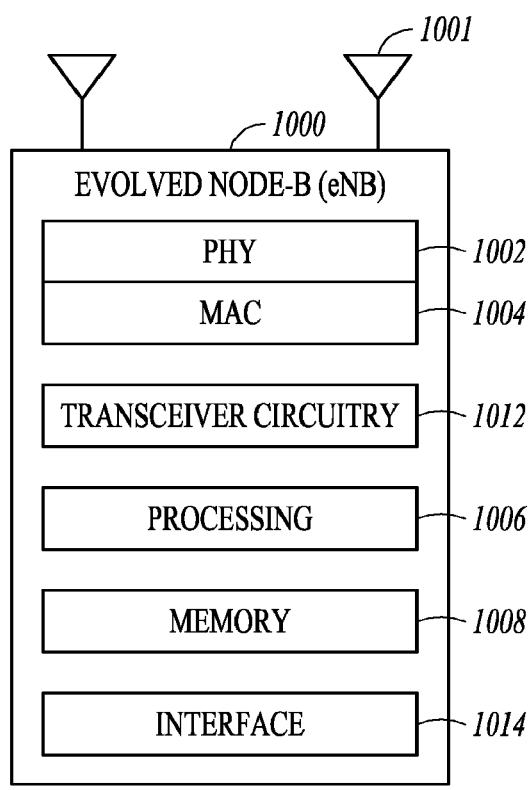
FIG. 10 illustrates a block diagram of a communication device in accordance with some embodiments.

FIG. 10 is a block diagram of a communication device in accordance with some embodiments. The device may be a UE or eNB, for example, such as the UE 802 or eNB 804 shown in FIG. 8 or the nUE 110, wUE 120, or E-UTRAN BS 130 of FIG. 1 that may be configured to track the UE as described herein. The physical layer circuitry 1002 may perform various encoding and decoding functions that may include formation of baseband signals for transmission and decoding of received signals. The communication device 1000 may also include medium access control layer (MAC) circuitry 1004 for controlling access to the wireless medium. The communication device 1000 may also include processing circuitry 1006, such as one or more single-core or multi-core processors, and memory 1008 arranged to perform the operations described herein. The physical layer circuitry 1002, MAC circuitry 1004 and processing circuitry 1006 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 1000 can be configured to operate in accordance with 3GPP standards or other protocols or standards, including WiMax, WiFi, WiGig, GSM, EDGE, GERAN, UMTS, UTRAN, or other 3G, 3G, 4G, 5G, etc. technologies either already developed or to be developed. The communication device 1000 may include transceiver circuitry 1012 to enable communication with other external devices wirelessly and interfaces 1014 to enable wired communication with other external devices. As another example, the transceiver circuitry 1012 may perform various transmission and reception functions such as conversion of signals between a baseband range and a Radio Frequency (RF) range.

The antennas 1001 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 1001 may be effectively separated to take advantage of spatial diversity and the different channel characteristics that may result.

Although the communication device 1000 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 11:
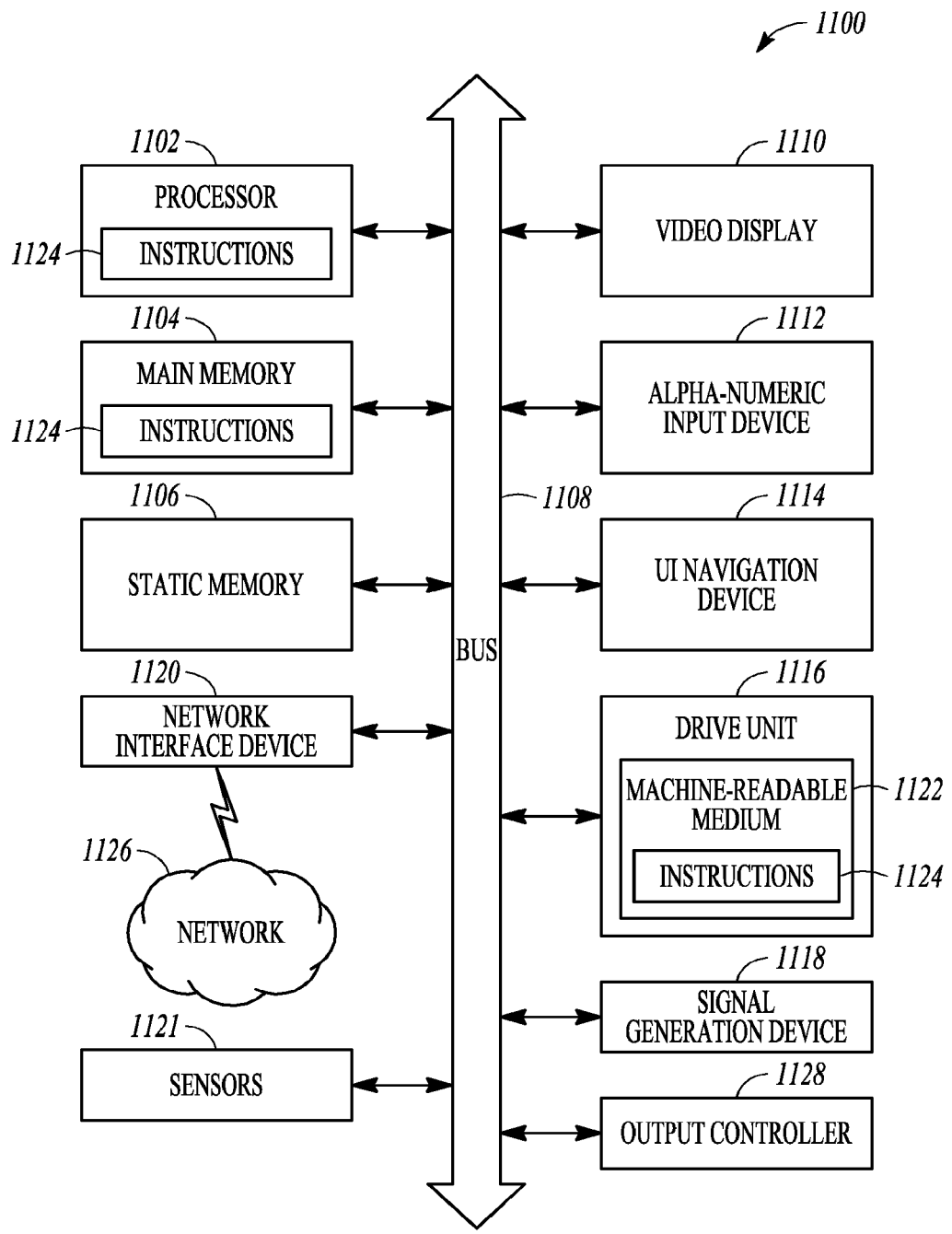
FIG. 11 illustrates another block diagram of a communication device in accordance with some embodiments.

FIG. 11 illustrates another block diagram of a communication device 1100 in accordance with some embodiments. The communication device 1100 may correspond to the nUE 110 or the wUE 120 of FIG. 1. In alternative embodiments, the communication device 1100 may operate as a standalone device or may be connected (e.g., networked) to other communication devices. In a networked deployment, the communication device 1100 may operate in the capacity of a server communication device, a client communication device, or both in server-client network environments. In an example, the communication device 1100 may act as a peer communication device in peer-to-peer (P2P) (or other distributed) network environment. The communication device 1100 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The communication device 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The communication device 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The communication device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1116 may include a communication device readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the communication device 1100. In an example, one or any combination of the hardware processor 1102, the main memory 1104, the static memory 1106, or the storage device 1116 may constitute communication device readable media.

While the communication device readable medium 1122 is illustrated as a single medium, the term "communication device readable medium" may include a single medium or multiple media (e.g., a centralized or distributed database, and/or associated caches and servers) configured to store the one or more instructions 1124.

The term "communication device readable medium" may include any medium that is capable of storing, encoding, or carrying instructions for execution by the communication device 1100 and that cause the communication device 1100 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), MIMO, or multiple-input single-output (MISO) techniques. In some examples, the network interface device 1120 may wirelessly communicate using Multiple User MIMO techniques. The term "transmission medium" shall be taken to include any intangible medium that is capable of storing, encoding or carrying instructions for execution by the communication device 1100, and includes digital or analog communications signals or other intangible medium to facilitate communication of such software.

The subject technology is described below in conjunction with various examples.

Example 1 is an apparatus of a wearable user equipment (wUE), the apparatus comprising: processing circuitry; and transceiver circuitry, the processing circuitry to: configure the wUE to enter into an active state; and configure the transceiver circuitry to: scan, in response to entering into the active state, for a Beacon signal from a network user equipment (nUE), wherein the Beacon signal comprises a Sync preamble for synchronizing the nUE and the wUE in a personal area network (PAN) according to a timing schedule; upon failing to detect the Beacon signal, send a probe signal to the nUE, wherein the probe signal comprises the Sync preamble for synchronizing the nUE and the wUE into the PAN according to the timing schedule; and upon detecting the Beacon signal or upon receiving a response to the probe signal, connect to the PAN associated with the nUE and communicate, within the PAN, according to the timing schedule from the Sync preamble.

In Example 2, the subject matter of Example 1 optionally includes that the processing circuitry is further to configure the transceiver circuitry to: upon failing to receive a response to the probe signal for at least a threshold time period, connect directly with an eNodeB (eNB) of a Long Term Evolution (LTE) cellular network.

In Example 3, the subject matter of any of Examples 1-2 optionally includes that sending the probe signal to the nUE comprises: sending the probe signal according to a timing schedule, the timing schedule being determined based on a timing schedule received from an eNodeB (eNB), a timing schedule of a nearby PAN, or a timing schedule pre-stored in the wUE.

In Example 4, the subject matter of Example 3 optionally includes that the timing schedule of the nearby PAN is determined based on a Sync preamble in a Beacon signal from the nearby PAN.

In Example 5, the subject matter of any of Examples 1-4 optionally includes that the Beacon signal from the nUE comprises a PAN-temp-ID for scrambling control and data channels within the PAN, wherein the PAN-temp-ID is periodically reselected to reduce collision probability.

In Example 6, the subject matter of any of Examples 1-5 optionally includes that the Beacon signal from the nUE comprises a Random Access (RA) preamble Config used to configure an RA preamble of the wUE.

In Example 7, the subject matter of any of Examples 1-6 optionally includes that the Beacon signal from the nUE comprises paging information for paging idle wUEs in the PAN.

In Example 8, the subject matter of any of Examples 1-7 optionally includes that the Beacon signal from the nUE comprises scheduling assignment (SA) information for resource scheduling assignment for intra-PAN communications.

In Example 9, the subject matter of any of Examples 1-8 optionally includes that the processing circuitry is further to idle the wUE; and wake up the wUE in response to receipt of the Beacon signal or a determination that the probe signal is to be transmitted.

In Example 10, the subject matter of any of Examples 1-9 optionally includes that communicating within the PAN comprises implementing licensed band communication, the licensed band communication comprising device-to-device (D2D) communication and resources allocated by an eNodeB (eNB) for intra-PAN communication.

In Example 11, the subject matter of any of Examples 1-10 optionally includes that communicating within the PAN comprises implementing unlicensed band communication, using carrier sensing or listen before talk algorithms to avoid collision with legacy technologies.

In Example 12, the subject matter of any of Examples 1-11 optionally includes that the transceiver circuitry is coupled with an antenna for communicating within the PAN or for communicating directly with an eNodeB (eNB).

In Example 13, the subject matter of any of Examples 1-12 optionally includes that the processing circuitry comprises a baseband processor.

In Example 14, the subject matter of any of Examples 1-13 optionally includes that the processing circuitry and the transceiver circuitry are coupled with a memory and an interface circuitry, the memory and the interface circuitry to provide a user interface associated with the wUE.

Example 15 is an apparatus of a network user equipment (nUE) comprising: processing circuitry; and transceiver circuitry, the processing circuitry to: configure the nUE to enter into a personal area network (PAN) idle state; and configure the transceiver circuitry to: listen, while in the PAN idle state, for a probe signal from a wearable user equipment (wUE), wherein the probe signal comprises the Sync preamble for synchronizing the nUE and the wUE into a PAN according to a timing schedule; upon detecting the probe signal from the wUE, enter into a PAN awake state; and implement, upon entering into the PAN awake state, an access procedure for providing, to the wUE, access to a PAN for communicating with the nUE according to the timing schedule.

In Example 16, the subject matter of Example 15 optionally includes that communicating within the PAN comprises using frames having an intra-PAN frame structure, the intra-PAN frame structure comprising a Beacon signal which specifies the timing schedule.

In Example 17, the subject matter of Example 16 optionally includes that the Beacon signal comprises a Sync preamble for synchronizing the nUE and the wUE in the PAN according to the timing schedule.

In Example 18, the subject matter of any of Examples 15-17 optionally includes that communicating within the PAN comprises implementing licensed band communication, the licensed band communication comprising device-to-device (D2D) communication and resources allocated by an eNodeB (eNB) for intra-PAN communication.

In Example 19, the subject matter of any of Examples 15-18 optionally includes that communicating within the PAN comprises implementing unlicensed band communication, using carrier sensing or listen before talk algorithms to avoid collision with legacy technologies.

In Example 20, the subject matter of any of Examples 15-19 optionally includes that the transceiver circuitry is coupled with an antenna for communicating within the PAN or for communicating directly with an eNodeB (eNB).

In Example 21, the subject matter of any of Examples 15-20 optionally includes that the processing circuitry comprises a baseband processor.

In Example 22, the subject matter of any of Examples 15-21 optionally includes that the processing circuitry and the transceiver circuitry are coupled with a memory and an interface circuitry, the memory and the interface circuitry to provide a user interface.

Example 23 is a computer-readable storage medium that stores instructions for execution by one or more processors to perform operations to configure a wearable user equipment (wUE) to: enter into an active state; scan, in response to entering into the active state, for a Beacon signal from a network user equipment (nUE), wherein the Beacon signal comprises a Sync preamble for synchronizing the nUE and the wUE in a personal area network (PAN) according to a timing schedule; upon failing to detect the Beacon signal, send a probe signal to the nUE, wherein the probe signal comprises the Sync preamble for synchronizing the nUE and the wUE into the PAN according to the timing schedule; and upon detecting the Beacon signal or upon receiving a response to the probe signal, connect to the PAN associated with the nUE and communicate, within the PAN, according to the timing schedule from the Sync preamble.

In Example 24, the subject matter of Example 23 optionally includes that the computer-readable storage medium further storing instructions which, when executed by the wUE, cause the wUE to: upon failing to receive a response to the probe signal for at least a threshold time period, connect directly with an eNodeB (eNB) of a Long Term Evolution (LTE) cellular network.

In Example 25, the subject matter of any of Examples 23-24 optionally includes that the computer-readable storage medium further storing that the instructions to send the probe signal to the nUE comprise instructions to: send the probe signal according to a timing schedule, the timing schedule being determined based on a timing schedule received from an eNodeB (eNB), a timing schedule of a nearby PAN, or a timing schedule pre-stored in the wUE.

Although an embodiment has been described with reference to specific example embodiments, it will be evident that various modifications and changes may be made to these embodiments. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein" Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wearable user equipment (wUE), the apparatus comprising:
   processing circuitry; and transceiver circuitry,
   wherein the processing circuitry is configured to:
     configure the wUE to enter into an active state; and
     configure the transceiver circuitry to:
       scan, in response to entering into the active state, for a Beacon signal from a network user equipment (nUE), wherein the Beacon signal from the nUE comprises a Random Access (RA) preamble Config used to configure an RA preamble of the wUE;
       upon failing to detect the Beacon signal after entering the active state, send a probe signal to the nUE; and
       upon detection of the Beacon signal or upon receipt of a response to the probe signal, connect to a personal area network (PAN) associated with the nUE and communicate within the PAN.

2. The apparatus of claim 1,
   wherein the Beacon signal comprises a Sync preamble for synchronizing the nUE and the wUE in the PAN according to a timing schedule,
   wherein the probe signal comprises the Sync preamble for synchronizing the nUE and the wUE into the PAN according to the timing schedule, and
   wherein said communicating within the PAN is performed according to the timing schedule from the Sync preamble.

3. The apparatus of claim 1, the processing circuitry further to configure the transceiver circuitry to:
   upon failing to receive a response to the probe signal for at least a threshold time period, connect directly with a base station of a cellular network.

4. The apparatus of claim 1, wherein sending the probe signal to the nUE comprises:

sending the probe signal according to a timing schedule, the timing schedule being determined based on a timing schedule received from a base station, a timing schedule of a nearby PAN, or a timing schedule pre-stored in the wUE.

5. The apparatus of claim 4, wherein the timing schedule of the nearby PAN is determined based on a Sync preamble in a Beacon signal from the nearby PAN.

6. The apparatus of claim 1, wherein the Beacon signal from the nUE comprises a PAN-temp-ID for scrambling control and data channels within the PAN, wherein the PAN-temp-ID is periodically reselected to reduce collision probability.

7. The apparatus of claim 1, wherein the Beacon signal from the nUE comprises paging information for paging idle wUEs in the PAN.

8. The apparatus of claim 1, wherein the Beacon signal from the nUE comprises scheduling assignment (SA) information for resource scheduling assignment for intra-PAN communications.

9. The apparatus of claim 1, wherein the processing circuitry is further configured to:
   idle the wUE; and
   wake up the wUE in response to receipt of the Beacon signal or a determination that the probe signal is to be transmitted.

10. The apparatus of claim 1, wherein communicating within the PAN comprises implementing licensed band communication, the licensed band communication comprising device-to-device (D2D) communication and resources allocated by a base station for intra-PAN communication.

11. The apparatus of claim 1, wherein the transceiver circuitry is coupled with an antenna for communicating within the PAN or for communicating directly with a base station.

12. The apparatus of claim 1, wherein the transceiver circuitry comprises a baseband processor.

13. The apparatus of claim 1, wherein the processing circuitry and the transceiver circuitry are coupled with a memory and an interface circuitry, wherein the memory and the interface circuitry are configured to provide a user interface associated with the wUE.

14. A method for operating a wearable user equipment (wUE), the method comprising:
   configuring the wUE to enter into an active state;
   scanning, in response to entering into the active state, for a Beacon signal from a network user equipment (nUE), wherein the Beacon signal from the nUE comprises a Sync preamble for synchronizing the nUE and the wUE in the PAN according to a timing schedule;
   upon failing to detect the Beacon signal after entering the active state, sending a probe signal to the nUE; and
   upon detection of the Beacon signal or upon receipt of a response to the probe signal, connecting to a personal area network (PAN) associated with the nUE and communicating within the PAN.

15. The method of claim 14, wherein the probe signal comprises the Sync preamble for synchronizing the nUE and the wUE into the PAN according to the timing schedule, and wherein said communicating within the PAN is performed according to the timing schedule from the Sync preamble.

16. The method of claim 14, the method further comprising:
   upon failing to receive a response to the probe signal for at least a threshold time period, connecting directly with a base station of a cellular network.

17. The method of claim 14, wherein sending the probe signal to the nUE comprises:
   sending the probe signal according to a timing schedule, the timing schedule being determined based on a timing schedule received from a base station, a timing schedule of a nearby PAN, or a timing schedule pre-stored in the wUE.

18. A non-transitory computer-readable storage medium that stores instructions for execution by one or more processors to perform operations to configure a wearable user equipment (wUE) to:
   configure the wUE to enter into an active state;
   scan, in response to entering into the active state, for a Beacon signal from a network user equipment (nUE), wherein the Beacon signal from the nUE comprises a personal area network (PAN)-temp-ID for scrambling control and data channels within the PAN;
   upon failing to detect the Beacon signal after entering the active state, send a probe signal to the nUE; and
   upon detection of the Beacon signal or upon receipt of a response to the probe signal, connect to a PAN associated with the nUE and communicate within the PAN.

19. The non-transitory computer-readable storage medium of claim 18,
   wherein the Beacon signal comprises a Sync preamble for synchronizing the nUE and the wUE in the PAN according to a timing schedule,
   wherein the probe signal comprises the Sync preamble for synchronizing the nUE and the wUE into the PAN according to the timing schedule, and
   wherein said communicating within the PAN is performed according to the timing schedule from the Sync preamble.

20. The non-transitory computer-readable storage medium of claim 18,
   wherein the PAN-temp-ID is periodically reselected to reduce collision probability.

* * * * *